United States Patent [19]

Chang

[11] 4,323,375
[45] Apr. 6, 1982

[54] AIR SEPARATOR FOR AIR COMPRESSOR

[76] Inventor: Ying-Chung Chang, No. 92, Sec. 2, San Min Rd., Taichung, Taiwan

[21] Appl. No.: 148,519

[22] Filed: May 9, 1980

[51] Int. Cl.³ .................... B01D 5/00; B01D 45/00; B01D 50/00; B01D 53/30
[52] U.S. Cl. .................... 55/270; 55/274; 55/318; 55/342; 55/432; 55/441; 55/456; 55/461; 55/DIG. 17
[58] Field of Search ................ 55/270, 274, 318–319, 55/325, 342, 432, 441, 456, 461–462, DIG. 17

[56] References Cited

U.S. PATENT DOCUMENTS

| 825,796 | 7/1906 | Bartlett et al. | |
| 1,925,373 | 9/1933 | Davies . | |
| 1,937,855 | 12/1933 | Stuard | 55/319 X |
| 2,205,336 | 6/1940 | Beach | 55/462 X |
| 2,212,429 | 8/1940 | Yutzler . | |
| 3,303,621 | 2/1967 | Hill . | |
| 3,596,440 | 8/1971 | Nutter et al. | 55/462 X |
| 3,616,627 | 11/1971 | Everett et al. | 55/274 |
| 3,713,279 | 1/1973 | Moore | 55/319 |

Primary Examiner—Kathleen J. Prunner
Attorney, Agent, or Firm—Cushman, Darby & Cushman

[57] ABSTRACT

A separator for an air compressor to separate aqueous vapor and oil gas from an air stream in which air from a compressor is directed into a casing and onto a conically converging member disposed in a protective sleeve, the impingement effecting separation. The air then passes through a zig-zag shaped tube extending from the sleeve bottom and impinges on an L-shaped plate to effect more separation. The liquid accumulates in the bottom of the casing to which a transparent tube is connected for indicating the liquid level. The separated air passes to the casing outlet via a round tube having a screw rod therein to provide final separation.

6 Claims, 3 Drawing Figures

AIR SEPARATOR FOR AIR COMPRESSOR

BACKGROUND OF THE INVENTION

Nowadays the conventional air separators installed in air compressor systems for filtering air therein may be classified into three categories.

The first category is a cooling type air separator which consumes a great deal of the energy source and is not economically practicable. The second category is a metal plate compartment type air separator which can not meet requirements for industrial pneumatic tools because its filtering effect is very low. The third category is a net-grid type air separator in which three drawbacks are found: (1) Simple filtering can not really and desirably separate the large volume of aqueous vapor and oil gas in the air, so the filtered air still contains excess aqueous vapor and oil gas. (2) After use for a period of time, a layer of oil dirt and foreign substance is often accumulated on the net-grid to greatly hinder the air circulation and seriously harm performance. (3) Since the simple net-grid structure can not thoroughly separate the oil, water and air, there is a large volume of water and oil in the filtered air; when a spray gun is used, the phenomenon of spraying out water drops and oil drops will always happen, and such an undesirable drawback seriously affects normal operation. The present invention overcomes these drawbacks.

Figure 1:
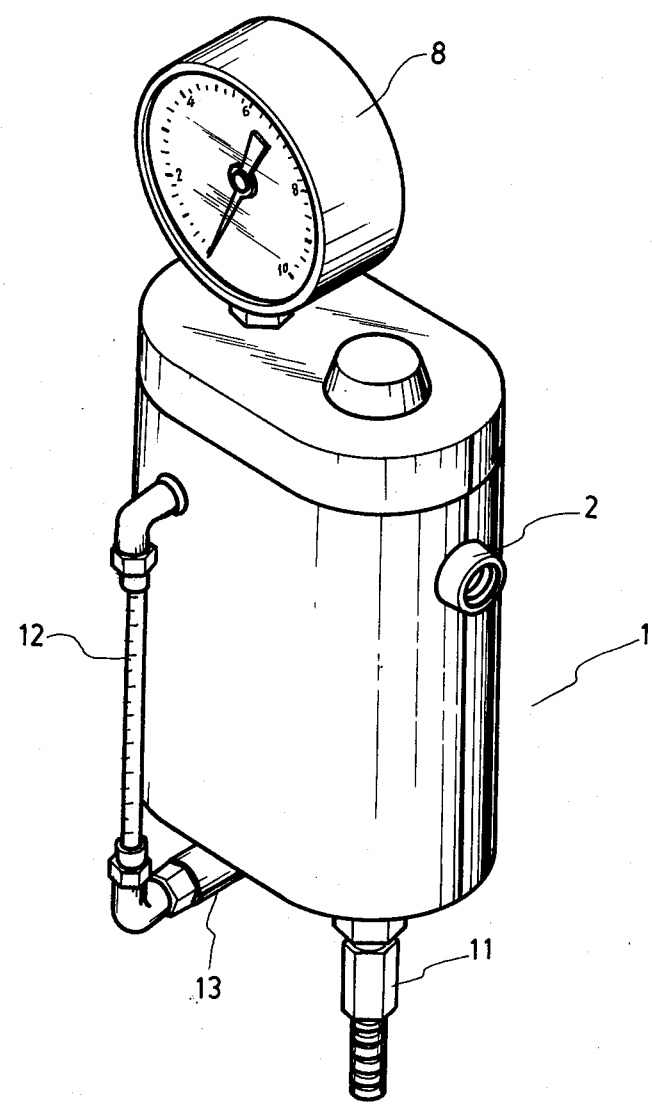
FIG. 1 is an elevation view of an air separator of the present invention.
Figure 2:
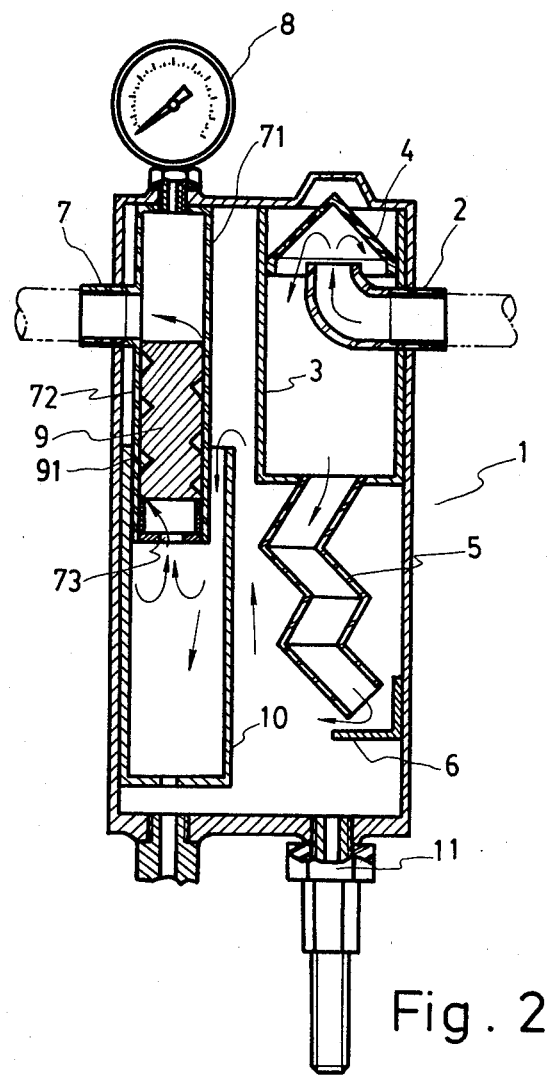
FIG. 2 is a section view of a main structural combination of an air separator of the present invention.

Reference numbers:
1. Ellipsoid casing
12 High-pressure pipe
2 air intake pipe
4 conic converger
6 L-shaped plate
71 upper end pipe
73 opening
9 screw rod
10 round pipe
11 draining control switch
13 connecting pipe
3 round protective sleeve
5 zig-zag shaped tube
7 air outlet pipe
72 lower end pipe
8 pressure meter
91 screw slot

DESCRIPTION OF PREFERRED EMBODIMENT

The present invention can be best described hereinafter in reference to the drawings.

The present invention is a novel air separator for an air compressor, which is characterized by these aspects: The air separator body is an ellipsoid casing (1), and an air intake pipe (2) on one side of said body extending into the interior of said body is L-shaped, passes through a round protective sleeve (3) and extends further into the central lower end of conic converger (4). The said conic converger (4) is set above one end of the air intake pipe (2) inside body (1) and the outer brim of said cover is protected by the round protective sleeve (3) which is a hermitically closed structure. The bottom of said sleeve (3) is connected to a zig-zag shaped tube (5). An L-shaped plate (6) made of iron is set opposite to the outlet of curved tube (5) for further converging and separating the aqueous vapor and oil gas. An air outlet pipe (7) installed on another side of body (1) is "⊣" shaped inside said body (1), and a pressure meter (8) is installed on the upper end pipe of said air outlet pipe which extends outside said body (1) for observation of the compressed air pressure released from the air outlet pipe (7). A screw rod (9) is installed in the lower end pipe (72) of which the bottom is hermitically closed, with only an opening (73) set on the lower end pipe for air-intake, and the lower end pipe is installed in a round pipe (10).

Figure 3:
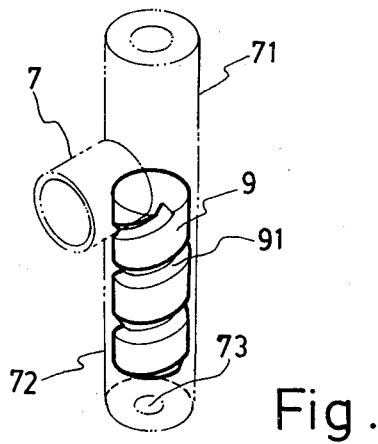
FIG. 3 is a structural sketch of a screw rod installed in the air outlet pipe (⊣ shaped pipe).

A draining control switch (11) for draining the internal accumulated liquid (waste liquid of mixed water and oil) is installed below the bottom edge of body (1) for draining. On the outer wall of said body (1) near the lower section thereof, a connecting pipe (13) (FIG. 3) is connected to a transparent high-pressure pipe (12) outside the said body (1) for observing the volume of said accumulated liquid of mixed water and oil in the air separator so as to be a reference for draining the same.

The operating principle of the present invention is described as follows.

The air separator of the present invention is connected to the air compressor and pneumatic tool respectively with air intake pipe (2) and air outlet pipe (7). The air compressor compresses and forwards the air (containing a large volume of aqueous vapor and oil gas) into body or casing (1) where the air contacts the conic converger (4) through the air intake pipe (2). Because of the air compressing force and through the characteristic of the hermitically closed structure of round protective sleeve (3), as soon as the said compressed air contacts the converger (4), the said converger (4) blocks the said air wherein the aqueous vapor and oil gas are condensed and compressed into large water drops and oil drops adhering to the wall of conic converger (4). After a large volume of said aqueous vapor and oil gas in the said air is removed, the said air proceeds along the zig-zag shaped tube (5) but is blocked by the L-shaped plate (6), so the residual aqueous vapor and oil gas therein are further condensed, removed and decreased so as to be extremely negligible, and the water drops and oil drops adhering to the wall of conic converger (4) will automatically drop down and flow to the inner bottom of the casing along the zig-zag shaped tube (5).

The compressed air, wherein the large volume of aqueous vapor and oil gas is removed by the converger (4), zig-zag shaped tube (5) and L-shaped plate (6), becomes air which contains an extremely small volume of aqueous vapor and oil gas and automatically escapes from the air outlet pipe (7) through the round pipe (10). However, when the said air enters into the air outlet pipe (7) from the opening (73) along the screw slot (91) of screw rod (9) in the lower end pipe (72), it is further blocked and the negligible volume of moisture and oil is further condensed into water drops and oil drops which will automatically drop down to the bottom of air filter body (1). Therefore, all the aqueous vapor and oil gas contained in the exhausted air will have been eliminated so as to increase the use and life of the pneumatic tool. Such a novel air separator has an effect several times larger than that of conventional ones.

The above-said liquid of mixed water and oil dropping and flowing down to the inner bottom of the air separator will slowly accumulate into a certain volume which can be observed through the transparent high-pressure pipe (12) so that it can be drained from said bottom by means of a draining switch.

I claim

1. A separator for an air compressor to separate aqueous vapor and oil gas from an air stream comprising:
   a vertically disposed casing having an air intake pipe for receiving air from a compressor and an outlet for discharging the air stream without the aqueous vapor and oil gas;
   a conically converging member mounted adjacent to but spaced from the end of said pipe within said casing;
   a vertically disposed cylindrical protective sleeve surrounding said member and mounted within said casing;
   said air intake pipe extending through said sleeve for directing air to be separated onto said member so that the impingement of air thereon effects separation;
   a zig-zag shaped tube extending from the bottom of said sleeve for conducting air and separated aqueous vapor and oil gas from said sleeve and effecting further separation;
   a plate mounted in said casing so that air leaving said zig-zag shaped tube is directed onto said plate to effect further separation, the separated liquid thereafter accumulating in the bottom of said casing;
   a transparent pipe connected to the interior of said casing and extending outside thereof for indicating the level of liquid in said casing; and
   a round pipe mounted adjacent said outlet and above the bottom of said casing has an open end so as to direct air leaving said zig-zag shaped tube to said outlet.

2. A separator as in claim 1 further including a pipe extending through the bottom of said casing for draining liquid therefrom.

3. A separator as in claim 1 wherein said member is mounted above said air intake pipe and said air intake pipe is curved to direct air upward onto said member.

4. A separator as in claim 1 wherein said plate is L-shaped.

5. A separator as in claim 1 wherein said casing is shaped as an ellipsoid.

6. A separator as in claim 1 wherein said outlet is in the form of a ⊣ shaped pipe with one leg extending through said casing, another leg including a screw rod therein and extending into said open end of said round pipe and a pressure meter connected to the other leg of said outlet pipe for indicating the pressure therein.

* * * * *